United States Patent
Dukart et al.

(10) Patent No.: US 8,281,665 B2
(45) Date of Patent: Oct. 9, 2012

(54) PRESSURE SENSOR ASSEMBLY

(75) Inventors: Anton Dukart, Gerlingen (DE); Gilbert Moersch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 13/000,129

(22) PCT Filed: Apr. 27, 2009

(86) PCT No.: PCT/EP2009/055021
§ 371 (c)(1),
(2), (4) Date: Mar. 21, 2011

(87) PCT Pub. No.: WO2009/156209
PCT Pub. Date: Dec. 30, 2009

(65) Prior Publication Data
US 2011/0167918 A1 Jul. 14, 2011

(30) Foreign Application Priority Data
Jun. 26, 2008 (DE) ...................... 10 2008 002 671.9

(51) Int. Cl.
G01L 7/08 (2006.01)
G01L 9/04 (2006.01)
(52) U.S. Cl. ........................................... 73/715; 73/720
(58) Field of Classification Search .............. 73/700–756
See application file for complete search history.

(56) References Cited

U.S. PATENT DOCUMENTS

| | | | | |
|---|---|---|---|---|
| 2,808,545 A | * | 10/1957 | Hirtreiter et al. | 361/283.3 |
| 3,234,795 A | * | 2/1966 | Li | 73/726 |
| 3,325,761 A | * | 6/1967 | McLellan | 338/4 |
| 5,796,007 A | | 8/1998 | Panagotopulos et al. | |
| 7,441,461 B2 | * | 10/2008 | Muth et al. | 73/756 |
| 2003/0200813 A1 | | 10/2003 | Baba et al. | |
| 2007/0044547 A1 | | 3/2007 | Zhang | |

FOREIGN PATENT DOCUMENTS

| RU | 2126533 C1 | * | 2/1999 |
|---|---|---|---|
| WO | WO 2006/023987 | | 3/2006 |

* cited by examiner

*Primary Examiner* — Andre Allen
(74) *Attorney, Agent, or Firm* — Kenyon & Kenyon LLP

(57) ABSTRACT

A pressure sensor assembly having a pressure tube, in which a diaphragm is situated as a pressure pickup, and having means for detecting the diaphragm deformations, which allow a spatial separation between the measuring medium acting on the diaphragm and the means for detecting the diaphragm deformations. The diaphragm of this pressure sensor assembly includes at least two diaphragm sections oriented at an angle to one another. A first diaphragm section is situated as a partition diaphragm in the cross-section of the pressure tube, while at least one second diaphragm section forms an area of the wall of the pressure tube as a side wall diaphragm. The means for detecting diaphragm deformations are situated on the outer side of the pressure tube on the side wall diaphragm.

5 Claims, 3 Drawing Sheets

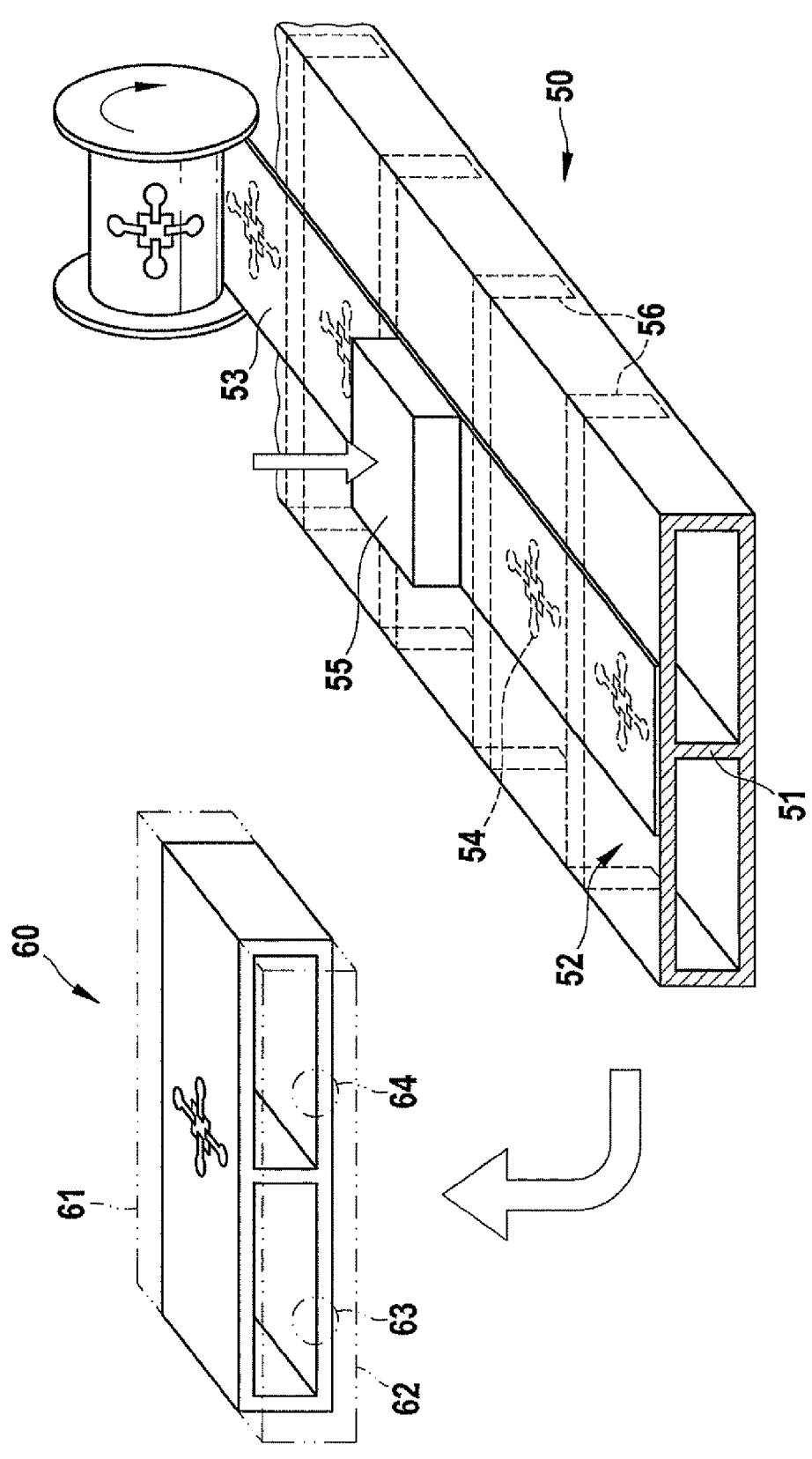

PRESSURE SENSOR ASSEMBLY

FIELD OF THE INVENTION

The present invention relates to a pressure sensor assembly having a pressure tube, in which a diaphragm is situated as a pressure pickup, and having means for detecting a diaphragm deformation.

BACKGROUND INFORMATION

Sensor assemblies are used, for example, in the context of monitoring diesel particulate filters, in order to measure the exhaust gas pressure upstream and downstream from the particulate filter and thus ascertain the state of its loading. Inter alfa, the cyclic burnoff of the particulate filter may be controlled on the basis of this information. For this application, the sensor assembly is to have a measuring range of approximately 1 bar.

Using sensor elements which are designed as differential pressure sensors for monitoring diesel particulate filters is known. Pressure detection is performed here with the aid of a diaphragm, to which pressure is applied on both sides. This sensor assembly is cost-effective, but proves to be problematic in practice, since not only the diaphragm rear side, but rather also the diaphragm front side is subjected to the measuring medium. Circuit elements for converting diaphragm deformations into electrical signals, such as a piezoresistive measuring bridge, are typically situated on the diaphragm front side. The functionality of such a circuit assembly is impaired by the contact with the aggressive measuring media.

SUMMARY OF THE INVENTION

The present invention provides a cost-effective pressure sensor assembly which allows a spatial separation between the measuring medium, which acts on the diaphragm, and the means for detecting diaphragm deformations.

For this purpose, the diaphragm of the pressure sensor assembly according to the present invention includes at least two diaphragm sections oriented at an angle to one another. A first diaphragm section is situated as a partition diaphragm in the cross-section of the pressure tube and has the pressure or the measuring medium to be detected applied thereto, while at least one second diaphragm section forms an area of the wall of the pressure tube as a side wall diaphragm. The means for detecting diaphragm deformations are situated according to the present invention on the outer side of the pressure tube on the side wall diaphragm.

It has first been recognized according to the present invention that non-planar diaphragms may also be used for pressure detection within a pressure tube, and diaphragms having multiple diaphragm sections at an angle to one another are suitable in particular for this purpose. In the case of such diaphragms, deformations of one diaphragm section are transmitted to the adjoining diaphragm sections. This is employed in the case of the pressure sensor assembly according to the present invention in that one diaphragm section is situated as a partition diaphragm in the cross-section of the pressure tube and a diaphragm section at an angle thereto forms an area of the pressure tube wall as a side wall diaphragm. The pressure conditions to be detected inside the pressure tube primarily result in a deformation of the partition diaphragm. This deformation is transmitted to the side wall diaphragm, so that the thus caused deformations of the side wall diaphragm also reflect the pressure conditions within the pressure tube. In contrast to the partition diaphragm, the side wall diaphragm is only in contact with the measuring medium inside the pressure tube on one side. According to the present invention, it is therefore provided that the means for detecting diaphragm deformations be situated on the outer side of the side wall diaphragm. In this way, the pressure sensor assembly according to the present invention may be used both as an absolute pressure sensor and also as a differential pressure sensor, depending on whether a defined reference pressure is applied to one side of the partition diaphragm or a measuring pressure is applied to both sides of the partition diaphragm.

In order to achieve the greatest possible deformation of the side wall diaphragm in the case of deformation of the partition diaphragm, these two diaphragm sections are preferably oriented essentially perpendicular to one another. For this purpose, it is additionally advantageous if the partition diaphragm abuts the side wall diaphragm(s) as centrally as possible, i.e., if the diaphragm is designed to be T-shaped or H-shaped in section.

In a preferred specific embodiment of the pressure sensor assembly according to the present invention, the pressure tube, the partition diaphragm, and the at least one side wall diaphragm are manufactured as one piece from a uniform material. Depending on the pressure and temperature conditions at the usage location, this material may be a semiconductor material such as silicon, metal, or plastic. The measuring range of the pressure sensor assembly according to the present invention is a function of the material of the diaphragm and may be set by the selection of the diaphragm dimensions, in particular the thickness and the diameter of the partition diaphragm and the side wall diaphragm.

As already explained, deformations of the side wall diaphragm are detected in the case of the pressure sensor assembly according to the present invention. Four resistive strain gauge elements which are situated on the side of the side wall diaphragm facing away from the measuring medium and are interconnected to form a Wheatstone bridge are used for this purpose in a preferred variant of the present invention. The steady component of the pressures acting on both sides of the partition diaphragm, which also results in deformation of the side wall diaphragm, may thus be compensated for. Temperature influences may also be compensated for in this manner.

BRIEF DESCRIPTION OF THE DRAWINGS

FIG. 5 shows a possibility for mass producing pressure sensor assemblies according to the present invention.

DETAILED DESCRIPTION

Figure 1:
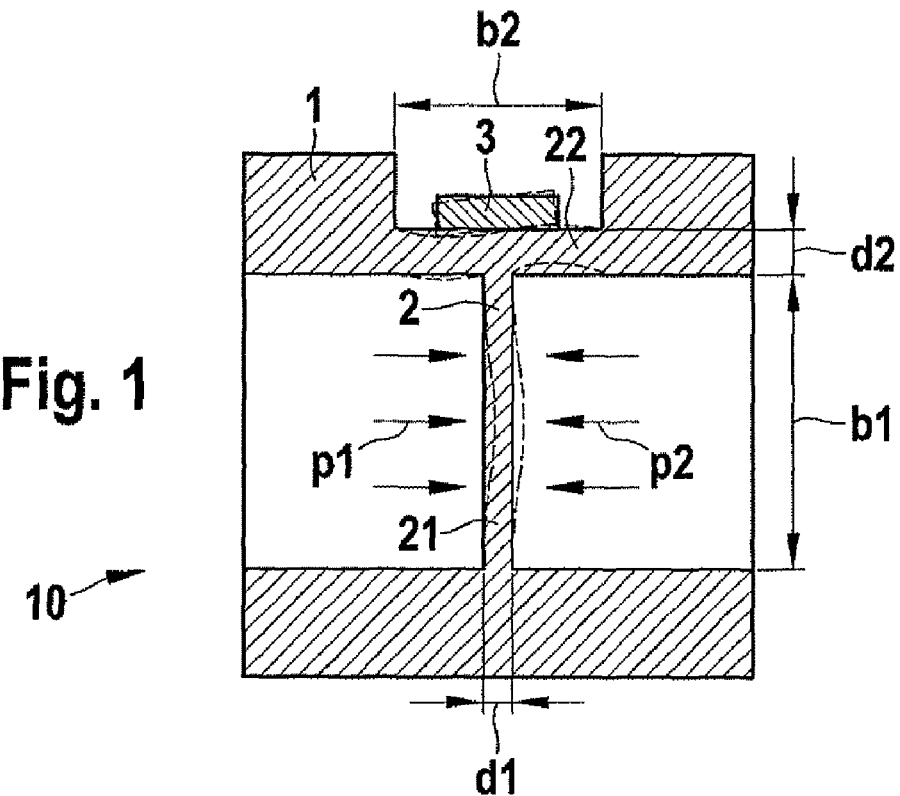
FIG. 1 shows a schematic longitudinal section through a pressure sensor assembly 10 according to the present invention.

Pressure sensor assembly 10 shown in FIG. 1 is implemented in the form of a pressure tube 1, in which a diaphragm 2 is positioned as a pressure pickup. According to the present invention, diaphragm 2 includes two diaphragm sections 21 and 22 oriented at an angle to one another. Diaphragm section 21 is situated as a partition diaphragm in the cross-section of pressure tube 1, while diaphragm section 22 forms an area of the wall of pressure tube 1 as a side wall diaphragm. Partition diaphragm 21 and side wall diaphragm 22 are oriented essentially perpendicularly to one another in the exemplary embodiment shown here, so that diaphragm 2 is designed to be T-shaped in section as a whole.

Pressure sensor assembly 10 is used as a differential pressure sensor. The two ends of pressure tube 1 each form a pressure connection here. Correspondingly, a measuring pressure p1 is applied to one side of partition diaphragm 21 and a measuring pressure p2 is applied to the other side. In the case shown here, p1 is greater than p2, so that the deformation of partition diaphragm 21 thus corresponds to difference p1-p2. This deformation of partition diaphragm 21 is transmitted to side wall diaphragm 22 and results in an asymmetrical deformation of side wall diaphragm 22, which also reflects the pressure conditions inside pressure tube 1 here. According to the present invention, this deformation of side wall diaphragm 22 is detected and converted into electrical signals. For this purpose, a chip 3 having four strain pickups is situated on side wall diaphragm 22, on the outer side of pressure tube 1, so that this chip 3 does not come into contact with the measuring media. The pressurized state of diaphragm 2 is shown by dashed lines in FIG. 1.

Figure 2:
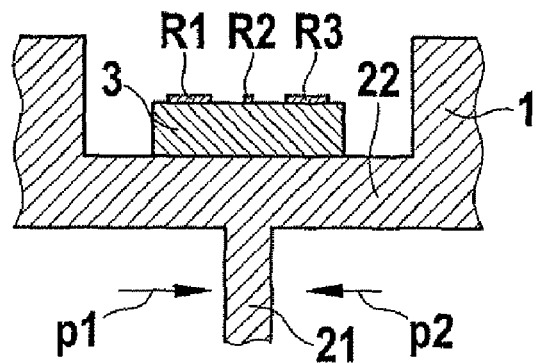
FIG. 2 shows an enlarged detail of the sectional illustration in FIG. 1.
Figure 3:
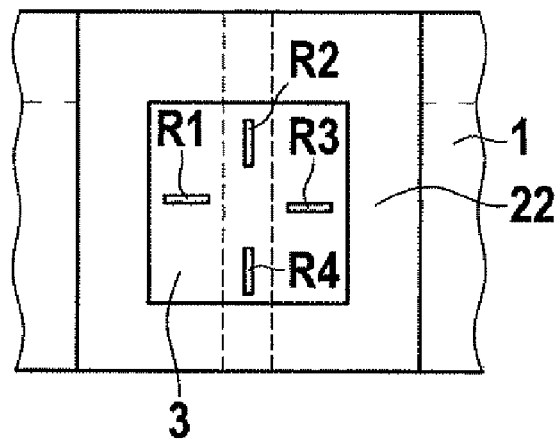
FIG. 3 shows a schematic top view of the side wall diaphragm shown in FIG. 2, having an assembly of four strain gauge elements.
Figure 4:
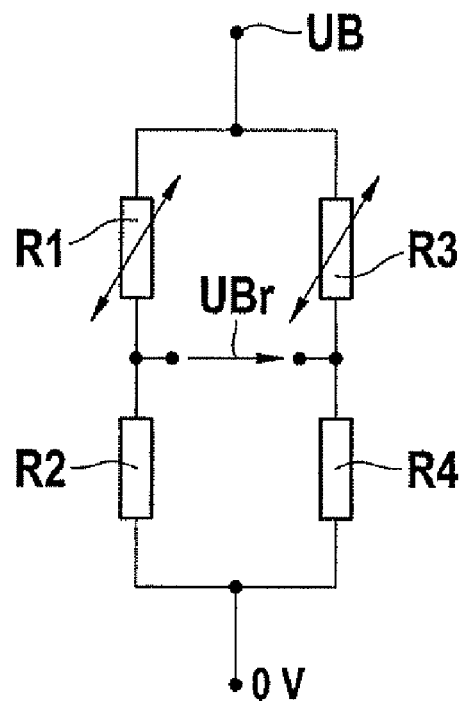
FIG. 4 shows a circuit diagram having the strain gauge elements shown in FIGS. 2 and 3.

Chip 3 is bonded in a force-fit and form-fit manner to side wall diaphragm 22, for example, by gluing or soldering, preferably by seal glass soldering. Such a bonding layer forms good electrical insulation between chip 3 and side wall diaphragm 22. FIGS. 2 and 3 illustrate the positioning of four piezoresistive strain pickups R1 through R4 on chip 3. Because of their positioning in the strain or compression area of side wall diaphragm 22, the resistance of strain pickups R1 and R3 changes in opposite directions when a differential pressure exists, i.e., if p1 and p2 are unequal and side wall diaphragm 22 is asymmetrically deformed. Since strain pickups R2 and R4 are situated directly in the abutting area of partition diaphragm 21, their resistance is independent of differential pressure p1-p2 inside pressure tube 1. R2 and R4 are only a function of temperature and deformations of side wall diaphragm 22, which are to be attributed to the steady component of both pressures p1 and p2. These influences on measuring signal UBr may be compensated for by interconnecting R1 through R4 to form a Wheatstone bridge, as shown in FIG. 4. If p1 is greater than p2, bridge signal UBr is positive and proportional to p1-p2. If p1 is less than p2, bridge signal UBr is negative and also proportional to p1-p2. If p1 and p2 are equal, side wall diaphragm 22 is at most symmetrically deformed. In this case, no bridge signal UBr arises.

Strain pickups R1 through R4 may be integrated in the form of a corresponding doped area in chip 3 or may also be implemented using thin-film technology on chip 3. The analysis circuit may also be positioned on chip 3. However, an independent separate chip may also be provided for the analysis circuit. The strain pickups may also be implemented in the form of silicon resistors or metallic resistors, for example, made of NiCr, on a carrier film, which is situated on the outer side of the side wall diaphragm. In any case, the strain pickups must be installed in a force-fit manner on the side wall diaphragm. Depending on the type of the strain pickups, this may be performed by a bonded connection such as gluing or soldering or also with the aid of a special two-component adhesive in the case of strain gauges based on PI film. Silicon strain pickups may be bonded to a Pyrex base or, in the case of a steel diaphragm, soldered on using glass solder.

In order to ensure the best possible transmission of deformations of partition diaphragm 21 to side wall diaphragm 22, pressure tube 1 having partition diaphragm 21 and side wall diaphragm 22 is manufactured in one piece from a uniform material, such as silicon or another semiconductor material, metal, or plastic. The entire structure may thus also be implemented micromechanically in a chip, in which two adjacent cavities are formed, which are separated from one another by a diaphragm which is T-shaped in section. The strain pickups are advantageously also integrated in the form of corresponding doped areas in the chip here. The selection of the material is essentially a function of the usage location of the pressure sensor assembly, the type of the measuring media, and the ambient temperature, as well as the desired pressure measuring range of the pressure sensor assembly. Diameter b1 of pressure tube 1 and/or partition diaphragm 21 is typically in the magnitude of 8-10 mm, while diameter b2 of side wall diaphragm 22 is in the magnitude of 4-5 mm. The measuring range of pressure sensor assembly 10 may additionally be influenced via thicknesses d1 and d2 of partition diaphragm 21 and side wall diaphragm 22.

FIG. 5 illustrates a possibility for mass producing pressure sensor assemblies according to the present invention starting from an aluminum continuous cast part 50 having a two-chamber profile. The middle wall of this continuous cast part 50 forms a partition diaphragm 51, while the side wall over the middle wall forms a side wall diaphragm 52. A tape 53 having strain gauge assemblies 54 is attached in the area of side wall diaphragm 52 over a partition diaphragm 51 with the aid of an adhesive stamp 55. Continuous cast part 50 is subsequently cut through at cutting points 56 shown as perforated. A thus isolated component 60 is shown in the left half of the image. The rear open end of component 60 was sealed in a pressure-tight manner using a lid 61. The pressure supply is performed via a second lid 62, which is placed on the front open end of component 60 and provided with two pressure connections 63 and 64. Pressure connecting pieces may subsequently be extruded onto this lid 62.

What is claimed is:

1. A pressure sensor assembly comprising:
    a pressure tube;
    a diaphragm situated in the pressure tube as a pressure pickup, the diaphragm including first and second diaphragm sections oriented at an angle to one another, the first diaphragm section being situated as a partition diaphragm in a cross-section of the pressure tube, the second diaphragm section forming an area of a wall of the pressure tube as a side wall diaphragm; and
    means for detecting diaphragm deformations situated on an outer side of the pressure tube on the side wall diaphragm.

2. The pressure sensor assembly according to claim 1, wherein the first and second diaphragm sections are oriented substantially perpendicular to one another, so that the diaphragm is T-shaped or H-shaped in section.

3. The pressure sensor assembly according to claim 1, wherein the pressure tube, the partition diaphragm, and the side wall diaphragm are manufactured in one piece from a uniform material.

4. The pressure sensor assembly according to claim 3, wherein the pressure tube, the partition diaphragm, and the side wall diaphragm are manufactured from a semiconductor material, metal, or plastic.

5. The pressure sensor assembly according to claim 1, wherein the means for detecting diaphragm deformations include four strain gauge elements, which are interconnected to form a Wheatstone bridge.

* * * * *